(12) United States Patent
Huang et al.

(10) Patent No.: US 8,340,116 B2
(45) Date of Patent: Dec. 25, 2012

(54) NODE SCHEDULING AND ADDRESS ASSIGNMENT WITHIN AN AD-HOC COMMUNICATION SYSTEM

(75) Inventors: Yan Huang, Weston, FL (US); Jisun Lee, Seoul (KR); Matthew R. Perkins, Sunrise, FL (US); Yoonmee Doh, Daejeon (KR); Hyunhak Kim, Daejeon (KR); Noseong Park, Daejeon (KR); Zhiying Yao, Shenzhen (CN)

(73) Assignee: Motorola Mobility LLC, Libertyville, IL (US)

( * ) Notice: Subject to any disclaimer, the term of this patent is extended or adjusted under 35 U.S.C. 154(b) by 893 days.

(21) Appl. No.: 12/133,755

(22) Filed: Jun. 5, 2008

(65) Prior Publication Data
US 2009/0303915 A1 Dec. 10, 2009

(51) Int. Cl.
*H04J 3/16* (2006.01)
(52) U.S. Cl. ...... 370/437; 370/314; 455/41.2; 455/456.1
(58) Field of Classification Search .................. 370/326, 370/338, 437, 312, 314, 320, 331; 455/41.2, 455/456.1
See application file for complete search history.

(56) References Cited

U.S. PATENT DOCUMENTS

| | | | | |
|---|---|---|---|---|
| 5,233,643 | A * | 8/1993 | Naeini et al. | 455/456.1 |
| 7,002,938 | B2 | 2/2006 | Hester et al. | |
| 7,023,814 | B2 * | 4/2006 | Kotzin | 370/312 |
| 7,397,774 | B1 * | 7/2008 | Holland et al. | 370/326 |
| 2002/0172215 | A1 * | 11/2002 | Hekstra-Nowacka | 370/437 |
| 2003/0137993 | A1 | 7/2003 | Odman | |
| 2003/0206531 | A1 * | 11/2003 | Shpak | 370/320 |
| 2003/0207699 | A1 * | 11/2003 | Shpak | 455/525 |
| 2004/0235468 | A1 * | 11/2004 | Luebke et al. | 455/426.1 |
| 2005/0064818 | A1 * | 3/2005 | Assarsson et al. | 455/41.2 |
| 2005/0180385 | A1 | 8/2005 | Jeong et al. | |
| 2005/0228902 | A1 * | 10/2005 | Lienhart et al. | 709/248 |
| 2005/0265286 | A1 * | 12/2005 | Umemura | 370/331 |
| 2005/0281207 | A1 | 12/2005 | Lee et al. | |
| 2007/0174465 | A1 | 7/2007 | Huang et al. | |
| 2007/0211681 | A1 * | 9/2007 | Sun et al. | 370/338 |

FOREIGN PATENT DOCUMENTS

KR 10-2004-0102956 A 12/2004

OTHER PUBLICATIONS

Yang, et al., "Utilization Based Duty Cycle Tuning MAC Protocol for Wireless Sensor Networks," Global Telecommunications Conference, 2005. Globecom '05. IEEE, vol. 6, Nov. 28-Dec. 2, 2005, pp. 3258-3262.

(Continued)

*Primary Examiner* — Andrew Lai
(74) *Attorney, Agent, or Firm* — Richard A. Wulff

(57) ABSTRACT

A method and apparatus for address assignment and node scheduling within an ad-hoc communication system is provided herein. During operation a personal area network coordinator (PANC) (40) will divide a superframe (301) into a plurality of slots, assigning each sub-tree under the PANC's direct child node to each slot for communication with the PANC. Each sub-tree coordinator will be assigned a same logical address by the PANC. As a result, a sub-tree coordinator synchronizes to the PANC node in only one subsuperframe slot assigned by the PANC with different sub-tree coordinators synchronizing to the PANC in different slots.

7 Claims, 5 Drawing Sheets

OTHER PUBLICATIONS

Neugebauer, et al., "Duty Cycle Adaptation with Respect to Traffic," 10th IEEE Conference on Emerging Technologies and Factory Automation, 2005, (ETFA 2005), vol. 2, Sep. 19-22, 2005 pp. 425-432.

Sung Cheal Byun, "PCT/US2009/042814—PCT International Search Report and Written Opinion," WIPO, ISA/KR, Korean Intellectual Property Office, Daejeon, Republic of Korea, Dec. 16, 2009.

* cited by examiner

100

40

NODE SCHEDULING AND ADDRESS ASSIGNMENT WITHIN AN AD-HOC COMMUNICATION SYSTEM

FIELD OF THE INVENTION

The present invention relates generally to ad-hoc communication systems, and in particular, to address assignment and node scheduling within ad-hoc communication systems.

BACKGROUND OF THE INVENTION

IEEE 802.15.4 MAC utilizes Beacon Order (BO) and Superframe Order (SO) to implement low duty cycle transmission of nodes within an ad-hoc communication system. The ZigBee Alliance™ system protocol requires all nodes in the same network to define the same BO and SO values. As a result, all nodes have the same duty cycles.

ZigBee networks support both tree and mesh topologies. In the tree topology, the personal area network coordinator (PANC) node serves as the tree root and is the sink for data collected in the tree. In applications where other tree devices need to operate in a low duty cycle, the PANC node also applies a low duty cycle to meet the ZigBee's requirements.

However, in a practical sensor network implementation, it is not necessary for the PANC node to operate in a low duty cycle, because it is usually attached to a powered information center (like a gateway that connects to internet or database). Simulation results also show that a low duty cycle PANC also causes traffic congestion when the network size below the PANC reaches a certain limit. Since it is more practical to implement a hard-powered PANC, making a PANC node as a full duty cycle tree root can help reduce the traffic congestion problem when high network scalability is required.

However, making a PANC a full duty cycle node should not change the low duty cycle operation of other tree nodes, especially the nodes as direct children of the PANC. In a normal operation, nodes that are direct children of the PANC wake up for one sub-superframe slot to talk to the PANC or receive messages from the PANC. When PANC operates in a full duty cycle, such nodes should not wake up randomly to send data to the PANC or listen continuously to the PANC for data targeted at it. They should continue waking up for one sub-superframe slot to talk to the PANC or receive message from PANC as previously designed.

In addition, the ZigBee network specification utilizes an address scheme called Cskip for tree networks. In Cskip, a maximum number of children (CM) value is defined consistently over the same network. This means that each node can have at most CM child nodes existing under it. This is also required for the PANC. However, when a fully duty cycle PANC is operational, the number of the PANC's direct children nodes should be extended and not be limited by CM. Therefore a need exists for node scheduling and address assignment within an ad-hoc communication system that allows for a PANC node to operate as a full duty cycle tree root.

Figure 1:
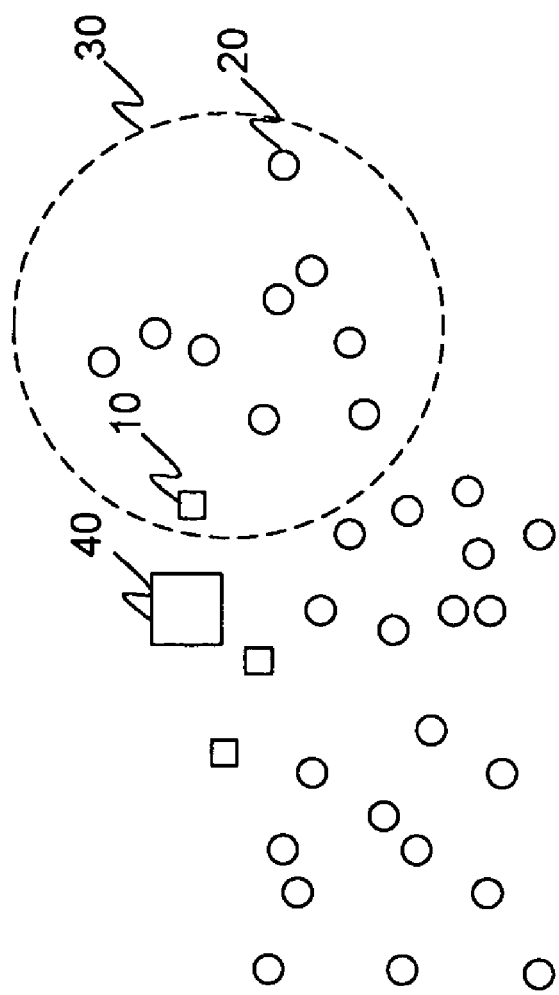
FIG. 1 is a block diagram of a communication system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for node scheduling and address assignment within an ad-hoc communication system is provided herein. During operation a personal area network coordinator (PANC) will divide a superframe into a plurality of slots, assigning each sub-tree under the PANC's direct child node (sub-tree coordinator) to each slot for communication with the PANC. Each sub-tree functions the same way as when the PANC operates under low duty cycle with only one sub-superframe slot. As a result, a sub-tree coordinator synchronizes to the PANC node in only one subsuperframe slot assigned by the PANC with different sub-tree coordinators synchronizing to the PANC in different slots.

Using the scheme, all sub-trees can continue to use the current ZigBee Cskip and IEEE 802.15.4 MAC Addressing Scheme as if there is only one sub-tree when PANC operates in low duty cycle. No cluster id needs to be introduced. In addition, the above scheme does not require CM children at the subtree coordinator layer and allows subtree coordinators be assigned same logical address by the PANC.

The result of the above solution is, the full duty cycle PANC can accommodate as many as N cluster trees under it, instead of only 1 cluster tree with a low duty cycle PANC. Note that the size of each individual cluster can be maximized to what a low duty cycle PANC can handle based on traffic. Therefore, the scalability of the new network is increased by N times if there are N sub-trees in the network.

The present invention encompasses a method for a Personal Area Network Coordinator (PANC) to assign addresses within an ad-hoc communication system. The method comprises the steps of determining a number of nodes in communication with the PANC, dividing a superframe into a number of slots corresponding to the number of nodes in communication with the PANC or a maximal number of allowed slots, whichever is smaller, and assigning each of the nodes in communication with the PANC a slot to utilize for communication with the PANC.

The present invention additionally encompasses a Personal Area Network Coordinator (PANC) comprising logic circuitry determining a number of nodes in communication with the PANC, dividing a superframe into a number of slots corresponding to the number of nodes in communication or a maximal number of allowed slots, whichever is smaller, with the PANC, assigning each of the nodes in communication with the PANC a slot to utilize for communication with the PANC, and assigning each of the nodes in communication with the PANC a same logical address. The PANC also comprises a transmitter transmitting the logical addresses to the nodes.

Prior to describing techniques for address assignment and node scheduling within an ad-hoc communication, the following definitions provide the necessary background for utilizing the techniques described below.

Physical Address: A physical address is a hardware address that uniquely identifies each node of a network and is unchanging. Such an address is usually "hard wired" into the node during its manufacture. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network medium. Consequently, each different type of network medium requires a different MAC layer. On networks that do not conform to the IEEE 802 standards but do conform to the OSI Reference Model, the physical address may be referred to as the Data Link Control (DLC) address.

Logical Address: A logical address is an address assigned to a device while connecting to a communication network. Such an address can be changed/reassigned in a network. In IEEE 802 networks the logical address is assigned during the 'association' process. In general the logical address is unique to the device assigning it (the 'parent' or 'master' device), but may be repeated when multiple networks are co-located or in an unusual circumstance like a device reset. On networks that do not conform to the IEEE 802 standards but do conform to the OSI Reference Model, the logical address may be referred to as the Logical Link Control (LLC) address.

PANC: A PANC is the Personal Area Network Coordinator. It serves as the root for the tree-based Personal Area Network. It is usually the sink to information collected by all nodes in the network. The PANC is assumed to be a ZigBee device and serves as the root of the network but may also be a general non-ZigBee device that is responsible for coordinating address assignment, address translation, general network formation, network maintenance, throughput filter, etc. Each of the nodes in communication with the PANC serves as a root for a sub-tree under the PANC.

Sub-tree coordinator: A direct child of a PANC. Each sub-tree coordinator serves as the root for each sub-tree under PANC. A PANC can have maximally $2^{BO}/2^{SO}$ sub-trees under it.

Turning now to the drawings, wherein like numerals designate like components, FIG. 1 is a block diagram of communication system 100. Communication system 100 preferably utilizes an ad-hoc communication system protocol defined by 802.15.3 Wireless Personal Area Networks for High Data Rates or IEEE 802.15.4 Low Rate Wireless Personal Area Networks. However one of ordinary skill in the art will recognize that other communication system protocols may be utilized without varying from the scope of the invention. For example, communication system 100 may utilize communication system protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), etc.

As shown, communication system 100 preferably includes a number of piconets 30, each comprising a coordinating device 10 (sub-tree coordinator) and a larger number of slave nodes 20 in communication with coordinating device 10. Nodes 20 represent devices that communicate with each other through synchronization provided by coordinating devices 10. Nodes 20 can be transportable (mobile) or they can be fixed in a given place. Subtree coordinator devices 10 are preferably in communication with Personal Area Network Coordinator (PANC) 40. All nodes form a multi-hop tree-based PAN, with PANC 40 at the root and the sub-tree coordinator 10 at the first layer of the tree. The sub-tree coordinators 10 are the nodes in range of PANC node. Other devices are either in range of PANC or out range of the PANC by multiple physical hops.

Figure 2:
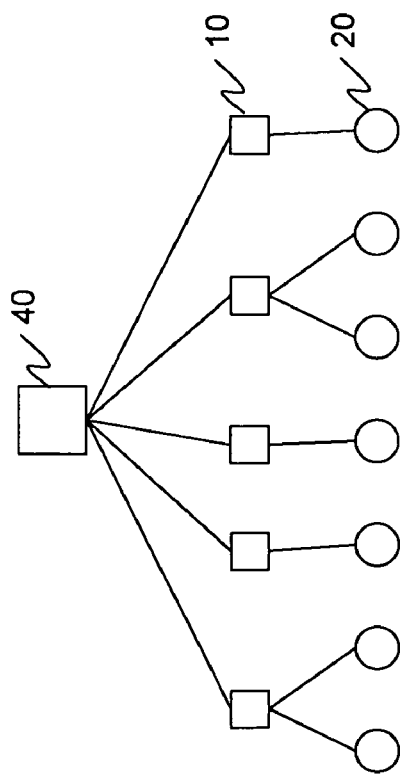
FIG. 2 is a more-detailed view of the communication system of FIG. 1.

FIG. 2 is a more-detailed view of system 100. During operation a plurality sub-tree coordinators 10 (only one labeled), each form a cluster or sub-tree of devices 20 (only one labeled). As is evident, all communication will pass through at least one coordinator 10 on its way to a PANC 40. Each sub-tree coordinator 10 can have up to a maximum number ($C_m$) children nodes under it. In a similar manner, each child node 20 can have up to $C_m$ child nodes and so on.

Figure 3:
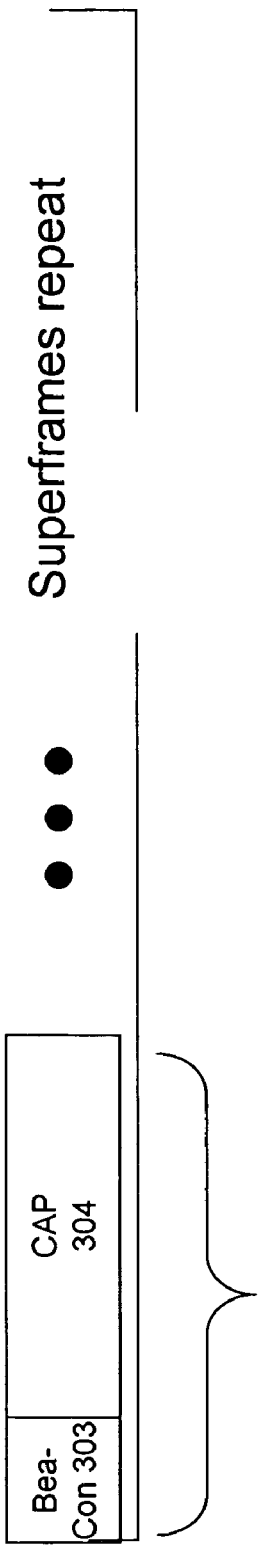
FIG. 3 illustrates a transmission scheme for the communication system of FIG. 2.

FIG. 3 illustrates a transmission scheme for the communication system of FIG. 2. During communication among devices within a piconet, a specific transmission protocol is utilized by communication system 100 where each sub-tree coordinator 10 communicates with PANC 40 within a particular non-overlapping slot of superframe. Thus, a first sub-tree coordinator 10 completes all necessary transmissions within a first slot of superframe 301, while a second sub-tree coordinator 10 completes all necessary transmissions within a second slot of superframe 301. During its particular slot, a sub-tree coordinator will broadcast its timing and control information within beacon field 303 and will have a Contention Access Period 304, transmission following the beacon. During its Contention Access Period (CAP), the sub-tree coordinator will communicate with its children nodes.

Figure 4:
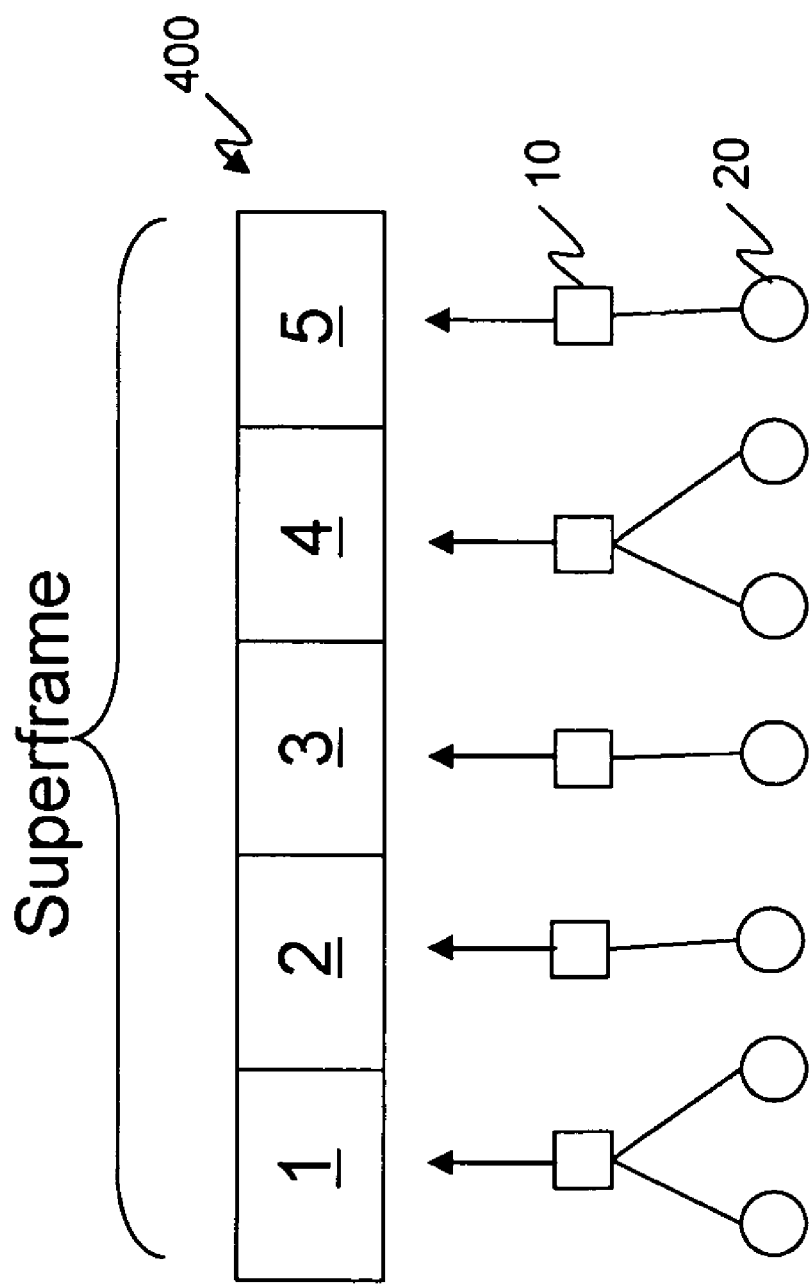
FIG. 4 illustrates the assignment of nodes to a slot of the superframe of FIG. 3.

FIG. 4 illustrates the transmission scheme of FIG. 3. It is assumed that the total number of subsuperframes is N, that is, $2^{BO}/2^{SO}$=N. Therefore, each superframe can be divided into N slots. Each sub-tree coordinator node will operate in one of these N slots in each superframe. However, the PANC node is awake in the full superframe.

Referring to FIG. 4, a PANC node divides each superframe into exactly N slots (in FIG. 4, assume N=5 for easy demonstration). Assume a low duty cycle PANC that operates in only one such slot can accept a maximal size X nodes below it. The above-described address scheme allows a full duty cycle PANC to accommodate maximally N such cluster trees below it, with each subsuperframe slot handling the traffic with each of these clusters.

Communications between PANC and the sub-tree coordinators in each sub-tree (cluster) observe the following properties:

1. PANC 40 numbers its slots.
2. PANC 40 manages which slot is for which cluster, and it numbers these clusters in its own network layer table using the corresponding slot number.
3. Each cluster's sub-tree coordinator 10 (which should be only 1 node) communicates with PANC 40 in its corresponding slot. For example, in cluster 1, the sub-tree coordinator (which is the root for that cluster) communicates with PANC in PANC's slot 1. In cluster n, the sub-tree coordinator (which is the root for that cluster) communicates with PANC in PANC's slot n. As a result, there is no need to assign cluster id in nodes' logical addresses.

4. Each cluster's sub-tree coordinator 10 can be assigned a same logical address (e.g. 1), because the communication slots are used to differentiate them. There is no need to use Cskip children address at this layer. As a result, when PANC 40 receives a packet from node address 1 in slot n, it knows it's from the subtree coordinator of cluster n.
5. When PANC 40 wants to send packets to nodes in cluster n, it uses the cluster n's own slot n to send these packets. As a result, the addressing to nodes in the clusters does not need to be changed. PANC 40 just needs to schedule these communications at a layer above the MAC. Therefore, there is no need to change the MAC layer header in the addressing field.
6. At PANC 40's network layer, PANC 40 should have a table for all the nodes in the whole network. In the table, each node's physical address is mapped to their cluster ID plus their logical address. Which cluster a node belongs to is completely decided by the slot in which the sub-tree coordinator forwards a network node's name to address mapping report to PANC 40.

Formation Process:
1. For the formation process, the Personal Area Network Coordinator (PANC 40) broadcasts beacon in each superframe. All the nodes follow exactly the same process as they do in the current ZigBee system to join a network. The only difference is, all nodes that are direct children of PANC 40, i.e., sub-tree coordinators 10, will be assigned a logical address of value 1 by PANC 40's network layer (instead of specific addresses based on the Cskip scheme, CM value, and the index of the children, as used in the ZigBee specification). PANC 40 will also tell the sub-tree coordinators' network layer which slot it should use to communication with PANC 40 (i.e. what's its cluster id). As a result, a subtree coordinator synchronizes to PANC 40 node in only one subsuperframe slot assigned by PANC 40 as what they do now in the ZigBee network. But different sub-tree coordinators synchronize to PANC 40 at different slots in the new scheme, in comparison to at the same slot in today's system.
2. The address assignment inside each sub-tree (cluster) stays the same as the Cskip scheme. The only difference is that there is not a CM value used at PANC 40, because all its direct children nodes use address 1. The real Cskip starts from the direct children nodes of the sub-tree coordinators. For each clusters, the root has an address of 1, and all others nodes use Cskip and starts with the first address in Depth 2 with 2 instead of 1.

Figure 5:
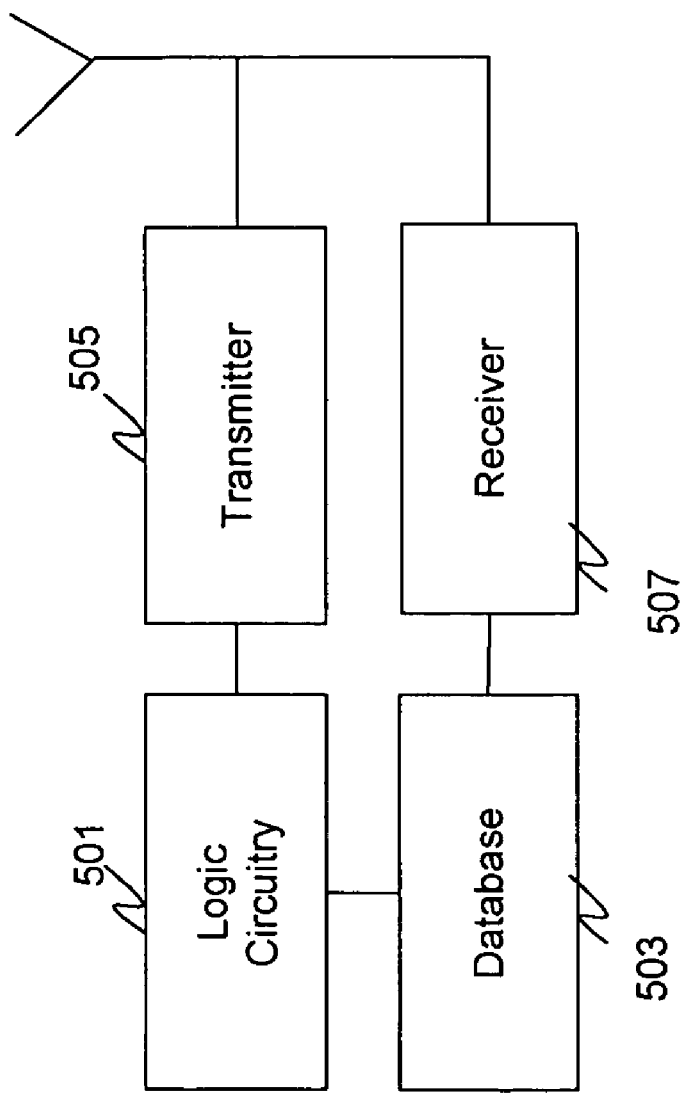
FIG. 5 is a block diagram of a PANC.

FIG. 5 is a block diagram of a PANC 40. As shown, PANC 40 comprises logic circuitry 501, transmitter 505, and receiver 507. Logic circuitry 501 preferably comprises a microprocessor controller, such as, but not limited to a Motorola PowerPC microprocessor. In the preferred embodiment of the present invention logic circuitry 501 serves as means for controlling PANC 40, and as means for analyzing message content to determine any actions needed. Additionally transmitter 505 and receiver 507 are common circuitry known in the art for communication utilizing a well known communication protocol, and serve as means for transmitting and receiving messages. For example, in one embodiment of the present invention, transmitter 505 and receiver 507 are well known neuRFon™ transmitters that utilize the neuRFon™ communication system protocol. Other possible transmitters and receivers include, but are not limited to transceivers utilizing Bluetooth, IEEE 802.11, or HyperLAN protocols.

Finally, database 503 comprises standard random-access memory and is used to store each node's physical address, cluster ID, and their logical address. Which cluster a node belongs to is completely decided by which slot the sub-tree coordinator forwards a network node's name to address mapping report to PANC 40.

Figure 6:
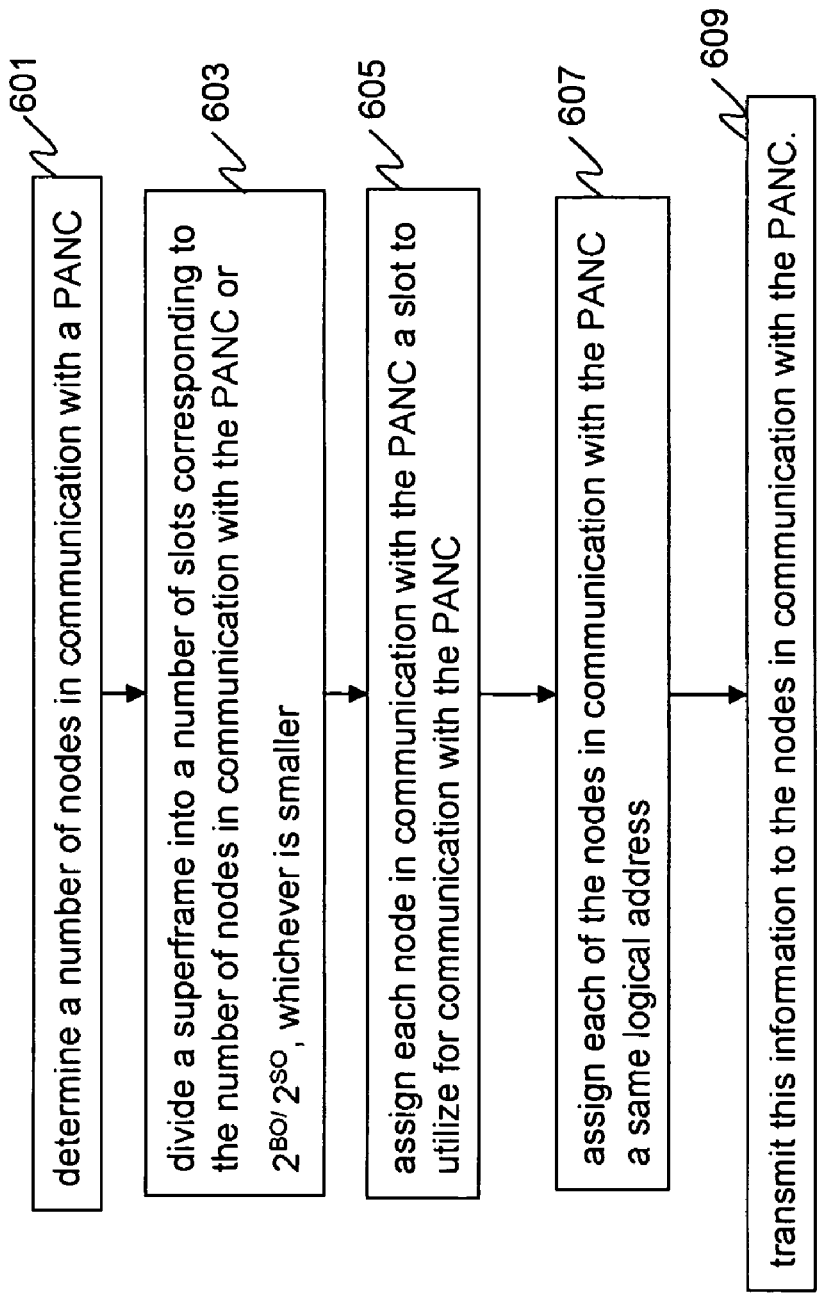
FIG. 6 is a flow chart showing operation of the PANC of FIG. 5.

FIG. 6 is a flow chart showing operation of the PANC of FIG. 5. More particularly, FIG. 6 is a flow chart showing a method for a Personal Area Network Coordinator (PANC) to do node scheduling and assign addresses within an ad-hoc communication system. The logic flow begins at step 601 where logic circuitry 501 determines a number of nodes in communication with the PANC. Once the number of nodes has been determined logic circuitry 501 divides a superframe into a number of slots corresponding to the number of nodes in communication with the PANC or a maximum number of allowed slots ($2^{BO}/2^{SO}$), whichever is smaller (step 603). Logic circuitry 501 then assigns each node in communication with the PANC a slot to utilize for communication with the PANC (step 605), and then assigns each of the nodes in communication with the PANC a same logical address (step 607). Finally at step 609, logic circuitry 501 utilizes transmitter 505 to transmit this information to the nodes in communication with the PANC.

It should be noted that when receiver 507 receives a communication from a particular node, logic circuitry 501 determines what slot the communication was received in and accesses database 503 to associate that slot with a particular physical address. In this way, logic circuitry can associate a particular message received to a particular node. When Logic circuitry 501 decides to transmit a message to a node with a particular physical address, it uses database 503 to decide which cluster the node belongs to, and what is its logical address, it then uses transmitter 505 to transmit data in the communication slot assigned to the cluster.

Note that in reality, it is very possible for nodes in different clusters under one PANC to hear each other in the neighborhood. And to allow real scalability, nodes in different clusters should be allowed to talk to each other directly. However, if all clusters use the same addressing scheme and address space without adding cluster id, nodes in different clusters will definitely have the same addresses. This makes differentiating same address nodes in different clusters as destination impossible. And a node cannot recognize two different nodes as neighbors if they have the same addresses. Therefore, an extension to the addressing scheme is made here to allow differentiating nodes in different clusters without cluster id.

The solution to this problem is to let each cluster tree's sub-tree coordinator node start with a different address. In Cskip scheme, a node's address is decided by CM value and child index with the starting address of the root node. If we let two sub-trees start with a different root address but apply the same value for other parameters, the nodes at the same depth and same child index will not have exactly the same address. Accordingly, by using the above solution, all nodes in the network can use another node's address, depth, and children index number to see whether they started with the same sub-tree node and decide whether they are in the same cluster tree. It becomes easy to decide whether two packets from the same address are from the same source node or not by looking at the node's depth and child index info. All these help a node to differentiate which cluster tree they belong to and avoid wrong identification.

Also note that currently we assume the PANC has N slots and each slot is a subsuperframe size in 802.15.4. This solution requires minimal modification to sub-tree coordinator nodes' synchronization time to the PANC. However, when N is greatly bigger than the maximal sub-tree coordinator nodes a PANC can have (i.e. the number of maximal neighbors (M), it is useful to make each slot size larger, i.e. to have totally M slots with superframe size/M.

To make this modification, the sub-tree coordinator nodes should be notified about the larger superframe size. The time for the sub-tree coordinator nodes to receive from the PANC should still be limited to the regular subsuperframe size at the beginning of each slot, to avoid sub-tree coordinator nodes using too much power to listen in the whole slot (whether PANC has data for it can be announced in the beacon). However, the sub-tree coordinator nodes should be allowed to transmit to the PANC node at any time within the slot. This solution will allow higher traffic from the cluster trees to the PANC node.

In addition, the method disclosed here also allows the PANC to disperse traffic among the sub-trees. The PANC can use the multi timeslot access to the network to eliminate traffic bottlenecks and to negotiate load balancing into the routing nodes.

In today's system, only one sub-tree can exist to communicate with PANC. The method disclosed here increases the scalability by N times. However, it is not necessarily for the N sub-trees to have the same traffic load. Using our method, the PANC can record traffic load based on the communication slots. If some communication slots have little or no traffic under a certain application condition, the PANC can reroute a congested subtree's traffic to these slots' corresponding subtrees. One specific method is for the PANC to send command and let some sensor nodes in a congested tree join a sub-tree with little or no traffic at the moment. Thus, logic circuitry 501 can thus be configured to determine an amount of traffic for each slot and re-route traffic from congested slots to slots having little congestion. To differentiate nodes in different sub-trees, the method described above to let each sub-tree start with a different address can be used.

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. In a personal area network, a method for a personal area network coordinator to coordinate communication with a plurality of sub-tree coordinators, the personal area network coordinator having a full duty cycle, each of the plurality of sub-tree coordinators having a low duty cycle that is less than that of the personal area network coordinator, the method comprising:

assigning a different timeslot to each of the plurality of sub-tree coordinators;

assigning a single logical address to the plurality of sub-tree coordinators;

associating a physical address of each of the plurality of sub-tree coordinators with its assigned timeslot;

identifying each of the plurality of sub-tree coordinators based on the associating step, and synchronizing with each of the identified plurality of sub-tree coordinators only during the sub-tree coordinator's assigned timeslot and only during a duty cycle of the sub-tree coordinator.

2. A personal area network comprising:

a plurality of sub-tree coordinators, each sub-tree coordinator of the plurality being associated with a sub-tree, each sub-tree comprising a plurality of nodes, each of the plurality of sub-tree coordinators having a same logical address;

a personal area network coordinator having a full duty cycle, the personal area network being configured to perform steps comprising, assigning a unique time slot of a superframe to each of the plurality of sub-tree coordinators, communicating with each of the plurality of sub-tree coordinators only during the time slot assigned to the sub-tree coordinator, and identifying each sub-tree coordinator of the plurality based on the time slot in which the communication occurred;

each of the plurality of sub-tree coordinators having a duty cycle that is less than the duty cycle of the personal area network coordinator, each of the plurality of sub-tree coordinators being configured to perform steps comprising receiving the assignment of the time slot from the personal area network coordinator, waking up only during duty cycle of the each sub-tree coordinator and during the assigned time slot, and communicating with the personal area network coordinator only during the assigned time slot.

3. The personal area network of claim 2, wherein the personal area network coordinator is further configured to perform steps comprising broadcasting a single beacon during the superframe.

4. The personal area network of claim 2, wherein the personal area network coordinator is further configured to perform steps comprising transmitting a message to a sub-tree coordinator of the plurality of sub-tree coordinators in its assigned time slot.

5. The personal area network of claim 2, wherein the personal area network coordinator is further configured to perform steps comprising informing each of the plurality of sub-tree coordinators of its assigned time slot.

6. The personal area network of claim 2, wherein the personal area network coordinator is further configured to perform steps comprising associating a physical address of each sub-tree coordinator of the plurality of sub-tree coordinators with a different time slot.

7. The personal area network of claim 2, wherein the personal area network coordinator is further configured to perform steps comprising receiving, from each sub-tree coordinator of the plurality of sub-tree coordinators, a beacon message during its assigned time slot.

* * * * *